United States Patent [19]

Mutoh

[11] Patent Number: 4,676,047

[45] Date of Patent: Jun. 30, 1987

[54] APPARATUS FOR FORMING A TAB ON A TAPE FOR TEARING A PACKING FILM

[75] Inventor: Yoshiyuki Mutoh, Tokyo, Japan

[73] Assignee: Japan Tobacco Inc., Tokyo, Japan

[21] Appl. No.: 815,720

[22] Filed: Jan. 2, 1986

[30] Foreign Application Priority Data

Mar. 29, 1985 [JP] Japan ............................ 60-045138[U]

[51] Int. Cl.[4] ............................................. B65B 61/18
[52] U.S. Cl. ........................................ 53/133; 53/131; 83/128; 493/321; 493/324; 493/963
[58] Field of Search ................. 53/133, 131, 411, 412; 83/123, 128; 493/963, 923, 930, 212, 321, 324

[56] References Cited

U.S. PATENT DOCUMENTS 2,098,165  11/1937  Riggenbach ...................... 101/226
2,619,897  12/1952  St. Lawrence .................. 83/128 X
3,685,249   8/1972  Jackson ................................ 53/133
3,818,675   6/1974  Griner ................................... 53/133
4,388,794   6/1983  Focke et al. ......................... 53/389

FOREIGN PATENT DOCUMENTS 1487209  7/1966  France .

*Primary Examiner*—James F. Coan
*Attorney, Agent, or Firm*—Murray and Whisenhunt

[57] ABSTRACT

An apparatus for forming a tab on a tearing tape for a packing film for a pack of cigarettes, etc. and printing an identifying color or pattern on the tab. A cutter is provided on a roller facing a roll for supporting a bonded assembly of a web for forming a plurality of tearing tapes and a web for forming a plurality of packing films. The cutter has a generally U-shaped cutting edge for cutting a tab for each tearing tape. A printing plate is disposed movably in the cutter for printing an identifying color or pattern on each tab simultaneously when it is cut. An inking roller is provided on the opposite side of the cutter from the supporting roll for supplying a printing ink to the printing plate. The printing plate has a printing surface surrounded by the cutting edge and projecting slightly therefrom when the printing plate is in its inoperative position. A spring urges the printing plate to stay in its inoperative position, but allows it to retract to enable the cutting edge to cut each tab, while the printing surface prints an identifying color or pattern thereon simultaneously.

5 Claims, 8 Drawing Figures

APPARATUS FOR FORMING A TAB ON A TAPE FOR TEARING A PACKING FILM

BACKGROUND OF THE INVENTION

This invention relates to an apparatus for forming a gripping tab on a tape for tearing a packing film, and more particularly, to such an apparatus including a device for coloring the tab or printing a colored pattern thereon to facilitate its identification.

A package of cigarettes etc. is usually wrapped in a cellophane or transparent film of a synthetic resin such as polypropylene. This wrapping film has a tab which can be gripped to pull a tape for tearing the film when the package is opened. The tearing tape is a transparent or colored tape of the same material as that from which the wrapping film is formed. The tape is attached to the inside of the wrapping film. One end of the tape slightly projects from a sealed joint on the film and defines the tab.

A known apparatus for forming such a tab usually comprises a device for bonding a tearing tape to an elongate wrapping film, and a cutter having a U-shaped cutting edge aligned with the tape for cutting it to a predetermined length having a U-shaped cut end defining a tab.

A device for coloring the tab is usually located separately from the tab forming apparatus. The tearing tape bonded to the film is colored at predetermined intervals and each colored portion thereof defines a tab. The coloring device is movable in the direction in which the film is fed, so that those portions of the tape which are to be colored may be altered. This prior art is disclosed in Japanese Utility Model Application laid open to the public under No. 38075/1981.

The tab formed by the conventional apparatus is, however, not easy to locate quickly, since the package on which it is provided carries a confusing continuous decorative pattern when the colors used therein are of a similar tone providing less contrast. This is particularly the case when the tab is held in intimate contact with the wrapping film. In this case, it is even likely that the tab may not serve for the purpose for which it is intended.

The coloring device disclosed in the Japanese Application hereinabove referred to is not intended for coloring a tab simultaneously when it is formed. It, therefore, follows that all the tabs cannot always be formed on the colored portions of the tape. Although the device is adjustable to alter those portions of the tape which are to be colored, this adjustment calls for extra work.

SUMMARY OF THE INVENTION

Under these circumstances, it is an object of this invention to provide a simple apparatus which can perform the cutting of a tab for a tearing tape on a packing film and the printing of a colored pattern on the tab simultaneoulsy so that the colored pattern may be correctly positioned on the tab to make it easy to identify.

This object is attained by an apparatus including a cutter provided on a roller facing a support roll and having a generally U-shaped cutting edge, and a printing plate disposed movably in the cutter, urged by a spring and having a printing surface projecting slightly from the cutting edge.

A packing film and a tearing tape bonded thereto are fed between the cutter and the support roll as they are rotated. The tape is cut by the U-shaped cutting edge to form a tab and a colored pattern is simultaneously printed on the tab by the printing plate. It is correctly printed on only the tab and is not printed on any other portion. It is printed on the whole surface of the tab. The apparatus is not only applicable to a tearing tape which is of the same color as a packing film, or as transparent as the film, but can also print a colored pattern on each transversely extending edge of the tape or on the tape itself to make the tab easy to identify. It is a simple apparatus which is easy to install on any existing film packing machine.

DETAILED DESCRIPTION OF THE INVENTION

Figure 1:
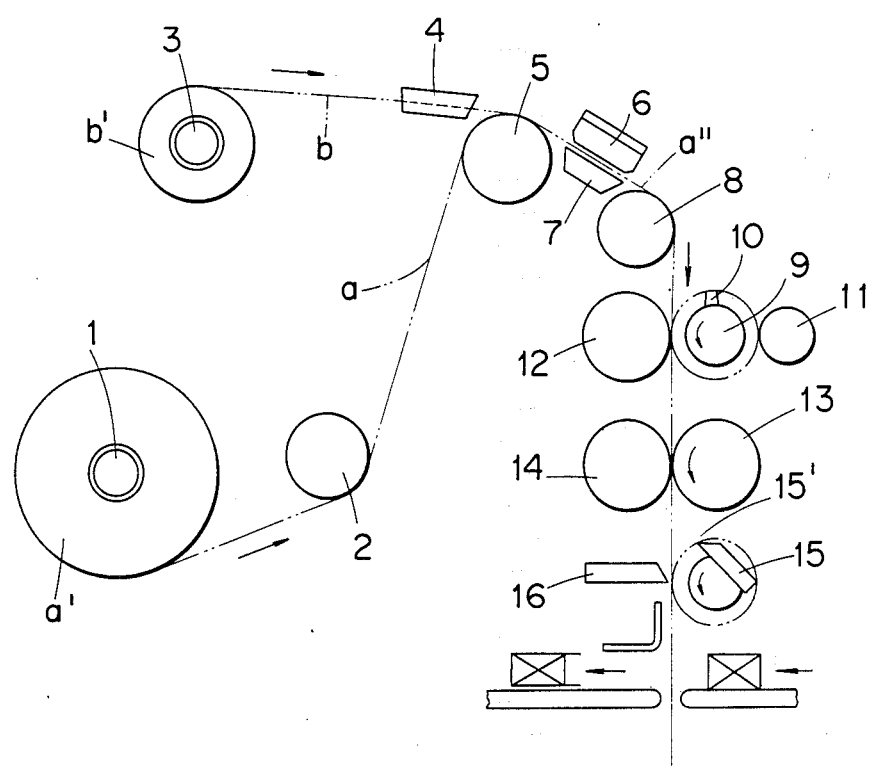
FIG. 1 is a schematic representation of an apparatus embodying this invention.

An apparatus embodying this invention is generally shown in FIG. 1. A web a of packing film is unwound from a supply reel a' on a shaft 1 which is freely rotatable and appropriately braked by a device not shown. The web a is fed continuously at a predetermined speed past guide rolls 2, 5 and 8 and between a driving roll 13 and a supporting roll 14 when the driving roll 13 is rotated.

A web b of tearing tape is likewise unwound from a supply reel b' on a shaft 3 which is freely rotatable, but appropriately braked by a device not shown. The web b is passed through a guide member 4, laid on the packing film a on the guide roll 5 and fed between a heating plate 6 and a supporting plate 7, whereupon it is bonded by heat to the packing film a to form a bonded film assembly a''. Alternatively, the tape b can be bonded to the film a by an appropriate adhesive.

Figure 2:
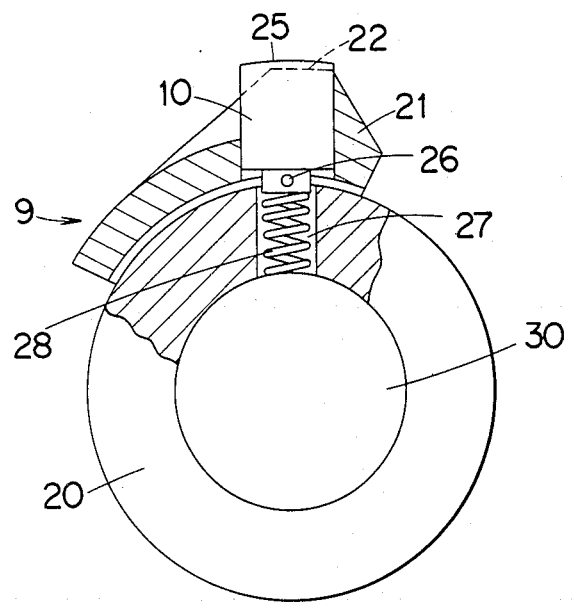
FIG. 2 is a front elevational view, partly in section, of a tab forming cutter.

According to a salient feature of this invention, a tab forming cutting device 9 is provided on the opposite side of a path for the bonded film assembly a'' from an anvil roll 12. The cutting device 9 comprises a cutter 21 having a generally U-shaped cutting edge 22 and a printing plate 10 of steel surrounded by the cutter 21, as shown in FIG. 2, and as will hereinafter be described in further detail. An inking roller 11 is provided on the opposite side of the cutting device 9 from the anvil roll 12. The cutter 21 is adapted for forming the bonded film assembly a'' with a U-shaped cut 22' which is longitudinally aligned with the tearing tape b. The printing plate 10 has a printing surface 25 surrounded by the U-shaped cutting edge 22. Simultaneously with the formation of the U-shaped cut 22' defining a tab, an appropriate color or pattern is transprinted by the printing surface 25 to form a printed area 25' on the tab.

A rotary blade 15 is provided on the opposite side of the driving roll 13 from the cutting device 9. It has a cutting edge 15' which extends along the width of the bonded film assembly, except the width of the U-shaped cut 22', to cut the packing film. Another blade 16 is provided on the opposite side of the path for the bonded film assembly from the rotary blade 15 and cooperates with the rotary blade 15 to cut the bonded film assembly to a specific length which is suitable for wrapping one package. The cutter 21 is provided on a roller 20, as shown in FIG. 2. Therefore, the blades 15 and 16 can alternatively be provided on the roller 20, too, adjacent to the cutting device 9 for cutting the bonded film assembly simultaneously with the formation of the U-shaped cut.

The tab forming cutting device 9 is shown in detail in FIGS. 2 to 5. The cutter 21 is secured to the surface of the roller 20 by an appropriate means not shown. The U-shaped cutting edge 22 is provided on the top of the cutter 21 and includes a pair of parallel edge portions extending in the direction in which the roller 20 is rotatable. The cutter 21 has a hole surrounded by the U-shaped cutting edge 22. The printing plate 10 contacts the peripheral surface of the hole and is movable out of, or into, the hole.

A hole defining a housing 27 is provided in the roller 20 below the hole in which the printing plate 10 is disposed. A compression spring 28 is provided in the housing 27 for supporting the printing plate 10 elastically. A hollow space is present between the bottom of the cutter 21 and the surface of the roller 20 to permit the vertical movement of the printing plate 10. The printing plate 10 is provided at its bottom with a pin 26 which defines a limited range for the upward movement of the printing plate 10. The spring 28 urges the printing plate 10 upwardly and the pin 26 abuts on the bottom 29 of the cutter 21. The bottom 29 of the cutter 21 is, therefore, positioned at an appropriate level of height above the spring 28 so that the printing surface 25 may appropriately project above the U-shaped cutting edge 22.

The cutting device 19 is secured to a rotary shaft 30 by an appropriate means not shown. The inking roller 11 is so positioned that the printing surface 25 may be able to contact it. They are rotated by a customary driving device at an equal surface velocity. An ink pot and an ink kneading roller for supplying an ink to the inking roller 11 are known in the art, and not shown. When the printing surface 25 faces the inking roller 11, the ink is supplied only to the printing surface 25 which projects beyond the U-shaped cutting edge 22, as the printing plate 10 is urged outwardly by the spring 28.

The anvil roll 12 is so positioned that the U-shaped cutting edge 22 may be able to press the bonded film assembly a" against the anvil roll 12. They are rotated by a customary driving device at a surface velocity which is equal to the speed at which the bonded film assembly a" is fed. If the cutting edge 22 faces the anvil roll 12, therefore, it forms a U-shaped cut 22', while the printing surface 25 simultaneously transfers a colored pattern onto the tearing tape and is caused by the anvil roll 12 to retract by overcoming the force of the spring 28. As the printing surface 25 is surrounded by, and located within, the U-shaped cutting edge 22, it is possible to finish both the formation of the U-shaped cut and the transfer printing of the colored pattern simultaneously. The colored pattern can be printed in its right position without projecting from the tab.

Figure 4:
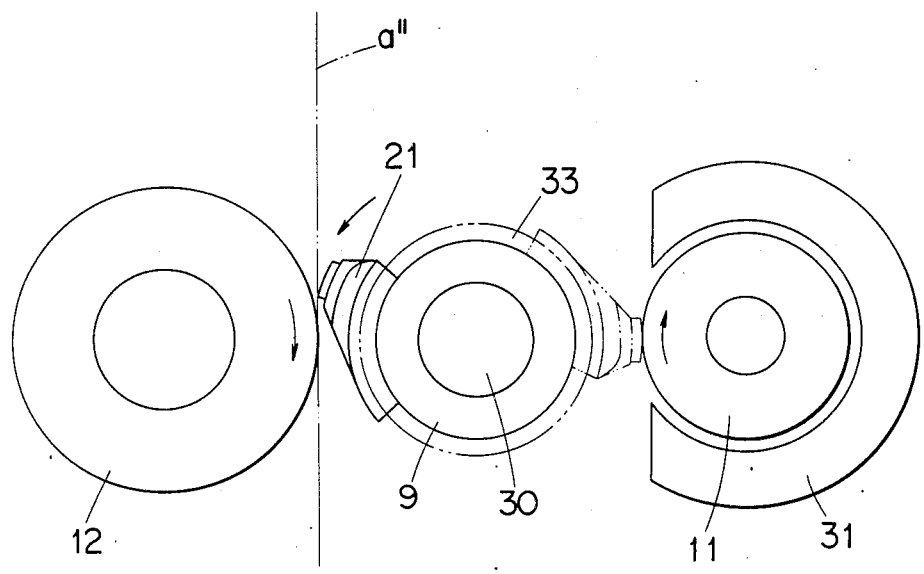
FIG. 4 is a front elevational view showing the operation of the cutter and some other parts of the apparatus associated therewith.
Figure 5:
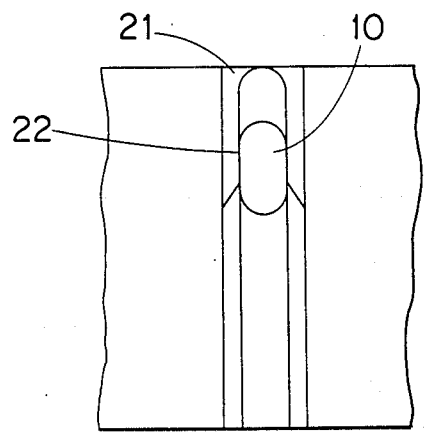
FIG. 5 is a fragmentary top plan view of the cutter.

As regards the ink for transfer printing, it is appropriate to use a quickly drying ink prepared from a thermoplastic resin so that the apparatus may be applicable to a high-speed film packing operation. Therefore, a heater is provided for heating the inking roller. It comprises a partly annular heater block 31 surrounding the inking roller 11, as shown in FIG. 4. In case such a heater is provided, the inking roller 11 may be a sponge roller having a surface covered by a felt or sponge layer which can be impregnated with a molten printing ink prepared from a thermoplastic resin.

Figure 3:
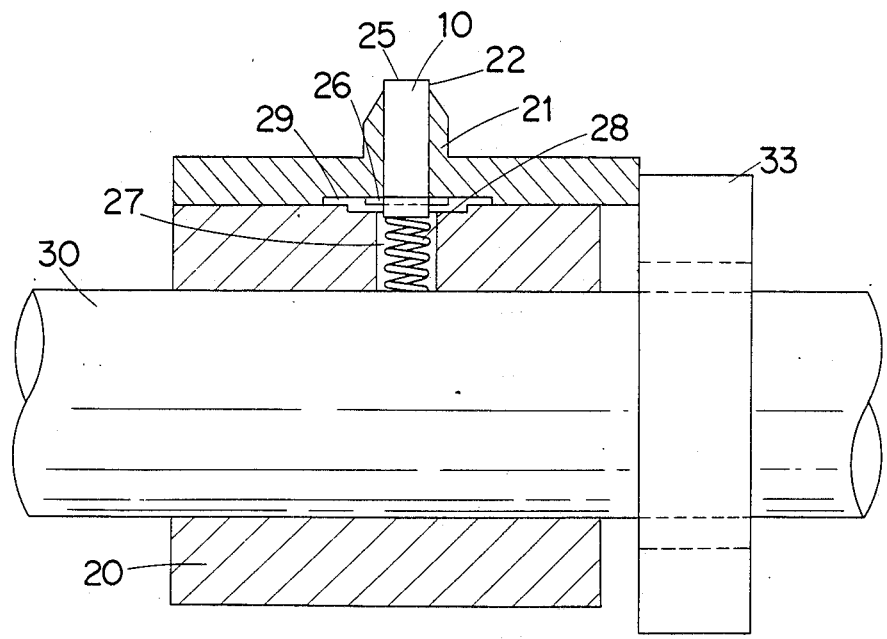
FIG. 3 is a side elevational view, partly in section, of the cutter shown in FIG. 2.

The cutter 21 has an edge projecting from the roller 20 and contacting an annular heater block 33 slidably when the roller 20 is rotated, as shown in FIG. 3. Heat is transmitted from the heater block 33 to the printing surface 25 through the cutter 21 to heat the printing surface 25. A spring not shown is provided for urging the heater block 33 elastically and keeping it in contact with the sliding surface of the cutter 24.

In order to heat the inking roller 11 and the printing surface 25, it is alternatively possible to provide a heater in each of the inking roller 11 and the printing plate 10 per se.

Figure 6:
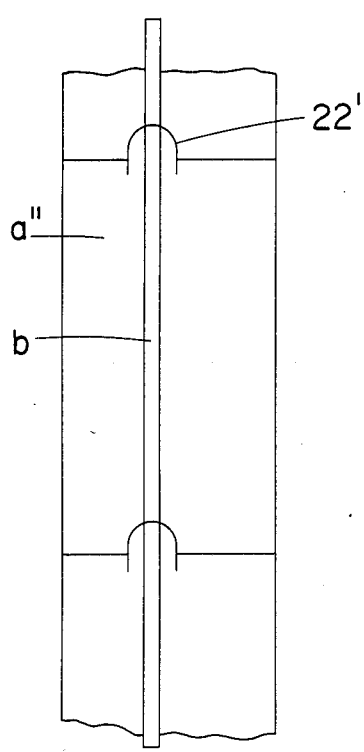
FIG. 6 is a fragmentary top plan view of a film.
Figure 7:
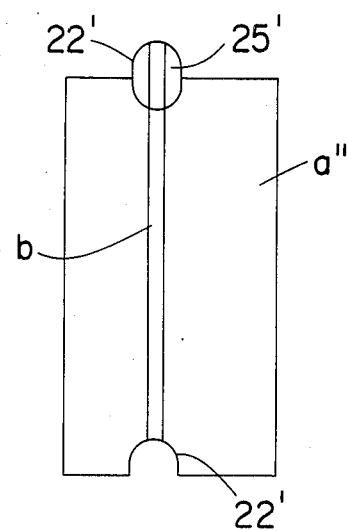
FIG. 7 is a top plan view of a film which has been cut from the film shown in FIG. 6 for wrapping one package.
Figure 8:
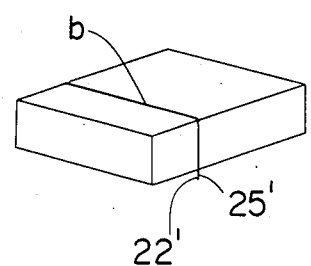
FIG. 8 is a perspective view of the package wrapped in the film shown in FIG. 7.

FIG. 6 illustrates the cutting of the U-shaped cut 22' in the tearing tape b by the U-shaped cutting edge 22 and of the bonded film assembly a" by the cutting edge 15'. For the sake of simplicity, the printed area 25' is not shown therein. It is shown in FIG. 7 which shows a unit film and tape assembly which has been formed by the apparatus of this invention for wrapping one package. It is also shown in FIG. 8 which shows the package wrapped by the film assembly.

What is claimed is:

1. In an apparatus for forming a tab on a tearing tape for a packing film and printing an identifying mark on said tab, the improvement which comprises:

an anvil roller for supporting a bonded assembly of a web for forming a plurality of tearing tapes and a web for forming a plurality of packing films;

a cutter, provided on a roller facing said anvil roller, for engaging and cutting said bonded assembly to form a tab for each of said tearing tapes, said cutter having a generally U-shaped cutting edge;

a movable printing plate, disposed in said cutter, for printing an identifying mark on said tab simultaneously with said cutting thereof, said movable printing plate having a printing surface surrounded by said cutting edge, said printing plate movable between a first position wherein said printing surface projects above said cutting edge and a second position wherein said printing surface is depressed below said cutting edge;

resilient means for yieldably urging said movable printing plate to said first position;

an inking roller, engageable of said printing surface when said printing plate is in said first position, for supplying a printing ink to said printing surface, said inking roller disposed on the opposite side of said roller carrying said cutter from said anvil roller.

2. The apparatus as set forth in claim 1, wherein said resilient means comprises a spring, disposed within said cutter, for yieldably urging said movable printing plate to said first position.

3. The apparatus as set forth in claim 2 further comprising a pin means, provided on said movable printing plate between said cutter and said roller on which said cutter is provided, for holding said printing plate so that said printing surface projects above said cutting edge by a predetermined amount when said printing plate is in said first position.

4. The apparatus as set forth in claim 1, further comprising a heater which surrounds at least a part of said inking roller.

5. The apparatus as set forth in claim 1, further comprising a heater contacting said cutter for transmitting heat to said printing surface through said cutter.

* * * * *